United States Patent
Andersen et al.

[11] Patent Number: 5,442,663
[45] Date of Patent: Aug. 15, 1995

[54] RESIDUAL CARRIER ADAPTIVE CROSS-POLARIZATION EQUALIZER

[75] Inventors: Steven Andersen, San Jose; James Berman, Los Altos; Chris Hinkle, Menlo Park; Michael Jacobson, San Jose; Richard Koralek, Palo Alto; James F. Lebar, San Jose; Francis J. Smith, Livermore, all of Calif.

[73] Assignee: Loral Aerospace Corp., New York, N.Y.

[21] Appl. No.: 231,135

[22] Filed: Apr. 22, 1994

[51] Int. Cl.⁶ .......................... H03H 7/30; H03H 7/40
[52] U.S. Cl. ...................................... 375/229; 375/232; 375/350; 370/6; 455/278.1; 455/303; 455/296
[58] Field of Search ........................ 375/11, 12, 13, 14, 375/15, 102, 103; 370/6, 20; 455/295, 296, 278.1, 303, 304

[56] References Cited

U.S. PATENT DOCUMENTS

| | | | |
|---|---|---|---|
| 4,438,530 | 3/1984 | Steinberger | 455/303 X |
| 4,577,330 | 3/1986 | Kavehrad | 455/295 X |
| 4,631,734 | 12/1986 | Foschini | 375/150 |
| 4,644,562 | 2/1987 | Kavehrad | 455/295 X |

*Primary Examiner*—Stephen Chin
*Assistant Examiner*—Bryan Webster
*Attorney, Agent, or Firm*—Kenneth W. Float; Anthony W. Karambelas

[57] ABSTRACT

An equalizer employed with a receiver for cancelling an interfering signal due to low cross-polarization isolation. The present equalizer provides a simple and inexpensive cross-polarization interference cancellation system. The equalizer uses an error signal generated in a residual carrier detector to determine the magnitude of an interfering signal and inputs a cancelling signal to the co-polarized channel until power in the error signal is minimized. In the equalizer, the determination of the magnitude of the interfering signal is performed at baseband (after demodulation but prior to data detection) and the cancellation is performed at RF, prior to dispersive microwave elements. In the receiver, co- and cross-polarized signals are received and amplified. A copy of the cross channel input signal is supplied to each receiver channel. An RF vector modulator is used to control the phase and amplitude of the cross-polarized signal prior to summation with a desired co-polarized signal. When the amplitude and the phase of the vector modulator are correctly set the interfering signal is cancelled. Control for the vector modulator is generated by minimizing the magnitude of the error signal produced by residual carrier detector. The residual carrier detector processes a recovered carrier signal derived from a demodulator in the co-polarization channel and an output of a downconverter of the cross-polarization channel to generate the error signal. The error signal is the difference between the received baseband data and an estimate of the ideal transmitted data. A control circuit sets the phase and amplitude of the vector modulator to minimize the magnitude of the error signal by stepping the setting of the vector modulator by one unit and sampling the power in the error signal. If the power is reduced the vector modulator is stepped again in the same direction. If the power is increased the vector modulator is stepped in the opposite direction.

8 Claims, 1 Drawing Sheet

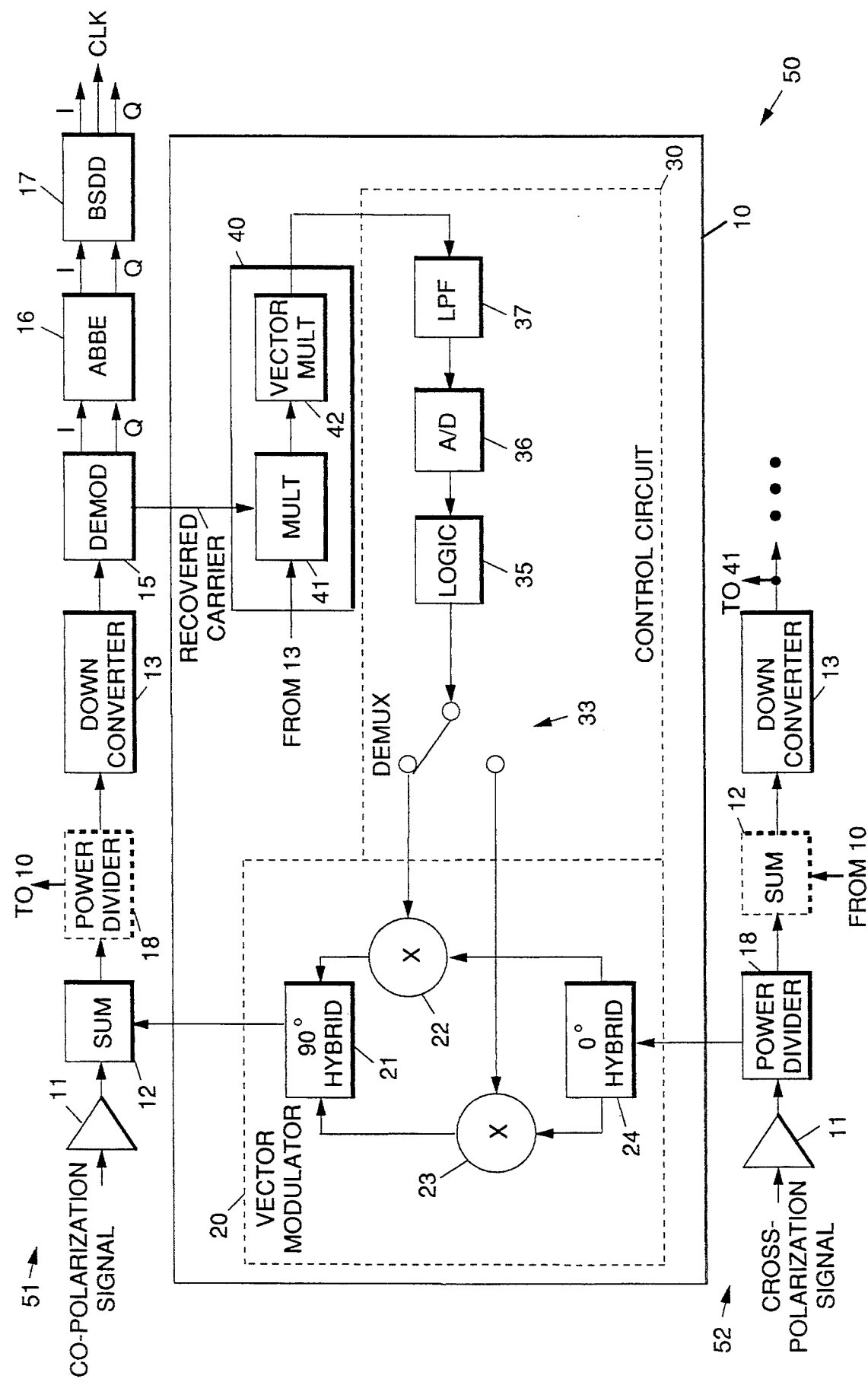

RESIDUAL CARRIER ADAPTIVE CROSS-POLARIZATION EQUALIZER

BACKGROUND

The present invention relates to adaptive equalizers, and more particularly, to a residual carrier adaptive cross-polarization equalizer that reduces or minimizes crosstalk between cross-polarized channels utilizing pilot signals to indicate the level of crosstalk.

With the increasing utilization of radio frequency communications, the allocatable radio frequency spectrum is rapidly becoming limited. Commercial allocations are encroaching on frequencies which to date have been available for broadband communications. In the future, contiguous RF allocations of several gigahertz will be hard to accommodate multi-gigahertz communications systems. Therefore, the radio frequency spectrum must be more efficiently managed and utilized. Frequency reuse, using orthogonal polarizations, is one approach to greater efficiency.

Adaptive baseband cancellation architectures have been tried in order to increase the available radio frequency spectrum utilization, but without complete success. These types of architectures typically use "four rail" adaptive baseband transversal equalizers (ABBE). These architectures require computation of the correlation of the interference on the I and Q signals of each channel with the I and Q signals of the other channel as well as the I and Q signals within each channel. This is a very complex architectures and is tied to one modulation and data rate.

The present invention addresses the problem of depolarization in communications systems. Depolarization introduces an interfering signal from the cross-polarized signal into the co-polarized signal. The primary source of interfering signals that cause depolarization is rain. To optimize system performance, the effects of the interfering signals must be minimized. Available field test data and analysis to date indicate that cross-polarization interference due to rain has a fluctuating amplitude and phase shift but that the depolarizing phenomena is nondispersive. The rate of fluctuation is estimated to be less than 1 Hz. Furthermore, due to the dispersive nature of filters in downconverters and demodulators used in adaptive equalizers and to avoid having to match delays between the two receivers, it is deskable to perform cross-polarization cancellation as close to the front end of the microwave chain as possible.

For the purposes of reference, U.S. Pat. No. 5,157,697 issued to Anvaru describes a system that suppresses crosstalk between orthogonal channels by subtracting a portion of the signal of one channel from the other as controlled by correlation factors. U.S. Pat. No. 4,466,132 issued to Namiki describes a system that eliminates crosstalk between two mutually orthogonal cross-polarized channels. The following references describe systems that are generally similar to the Namiki patent: U.S. Pat. No. 4,112,370 issued to Monson; U.S. Pat. No. 4,438,530 issued to Steinberger, U.S. Pat. No. 4,479,258 issued to Namiki; U.S. Pat. No. 4,637,067 issued to Steinberger; and U.S. Pat. No. 4,688,235 issued to Tahara et al. U.S. Pat. No. 3,735,266 issued to Amitay and U.S. Pat. No. 4,090,137 issued to Soma et al describe systems that reduce or minimize crosstalk between cross-polarized channels utilizing pilot signals to indicate the level of crosstalk.

Therefore, it is an objective of the present invention to provide for a residual carrier adaptive cross-polarization equalizer that reduce or minimize crosstalk between cross-polarized channels utilizing pilot signals to indicate the level of crosstalk.

SUMMARY OF THE INVENTION

In order to meet the above and other objectives, the present invention comprises a residual carrier adaptive cross-polarization equalizer that provides for cancellation of an interfering signal due to low cross-polarization isolation caused by rain on high data rate communication links. The residual carder adaptive cross-polarization equalizer is employed with a receiver that comprises co-polarization and cross-polarization receiver channels for processing co- and cross-polarized input signals. Each channel comprises a low noise amplifier, a summing device, a downconverter, a demodulator, a least mean-square estimate adaptive baseband equalizer, and a bit sync data detection circuit.

The residual carrier adaptive cross-polarization equalizer comprises a residual carrier detector, a control circuit, and a vector modulator. The residual carrier detector is comprised of a multiplier coupled to a vector multiplier. The residual carrier detector processes a recovered carrier signal derived from the demodulator of the co-polarization channel and an output of the downconverter of the cross-polarization channel to generate an error signal. The error signal output of the residual carder detector is applied to the control circuit. The control circuit comprises a low pass filter, an analog to digital converter a logic circuit and a demultiplexer. The filtered output of the low pass filter is applied to the analog to digital converter which processes the output of the low pass filter to produce digitized signal for processing. The output of the analog to digital converter is processed by the logic circuit which generates control signals that control the vector modulator. The output of the logic circuit is demultiplexed by the demultiplexer, and outputs of the demultiplexer are processed by the vector modulator.

The vector modulator comprises first and second multipliers that combine output signals derived from the: respective demultiplexer with output signals generated by a zero-degree hybrid. The zero-degree hybrid generates its output signals from the output of the power divider of the cross-polarization receiver channel. Outputs of the respective multipliers are applied to a ninety-degree hybrid which combines the respective output signals therefrom and applies the summed signal to the summing device in the co-polarized receiver channel which sums this signal with the amplified co-polarized input signal.

The present invention provides for an equalizer that is capable of carrying separate information on two cross-polarized channels having the same frequency, and that minimizes crosstalk therebetween. The residual carrier signal derived from the demodulator, or a carrier pilot tone inserted into the signal, is monitored to determine the extent of crosstalk from one channel to the orthogonal channel, and a copy of the phase and amplitude of the cross-polarized signal is used to cancel the crosstalk.

Utilizing the residual carrier of each wideband signal, or the carrier pilot tone inserted into the signal, carrier recovery loops in the two demodulators detect the phase of the carriers for each signal. The phase of the residual carrier from the one signal is correlated with the orthogonal signal using the multiplier and vector multiplier in the residual carrier detector such that the crosstalk due to the orthogonal channel is determined. The residual carrier crosstalk is monitored while a copy of the phase and amplitude of the cross-polarized signal is varied and is used to cancel the interference in the co-polarized channel. One tap cross-polarization equalization is performed at RF before the signals are subjected to any dispersive elements in the microwave chain.

The present equalizer does not require symmetry between the orthogonal channels. The orthogonal channels may differ in both data rate and modulation. If the two cross polarization phenomena are not symmetrical, the equalizer is not adversely effected. The approach used in, the present equalizer assumes that the cross polarization phenomena is nondispersive. If the phenomena is dispersive, but in a deterministic manner at least to a first order, an additional phase shift, as a function of frequency, may be introduced at RF along with the signal tap used for residual carrier suppression.

The update time to the control loop for the adjustment of phase and amplitude of the interfering signal does not pose a problem. The cross-correlation of the interfering residual carrier is conducted continually and the one tap phase and amplitude is adjusted continually.

The present invention provides for cross-polarization cancellation of an interfering signal. The equalizer uses the residual carrier leakage from the cross-polarization channel into the co-polarization channel to determine the magnitude of the interfering signal and then inputs a cancelling signal until residual carrier interference signal decreases to zero. In the present equalizer, the determination of the magnitude of the interfering signal is performed at IF and the cancellation is performed at RF, prior to the dispersive microwave elements. This provides the capability of frequency reuse for transmitting two unique signals in the same frequency allocation. The 5present equalizer works even if the modulations and data rates on the two channels are different.

The present equalizer thus provides a simple and inexpensive cross-polarization interference cancellation system. The system may be used with any modulation and data rate on either channel. If the cross-polarization phenomena is dispersive, extra vector modulators may be added at RF in a transversal filter arrangement. The IF detection and cancelation algorithm at IF may be applied to any RF carder frequency.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole drawing FIGURE is a block diagram of a residual carrier adaptive cross-polarization equalizer in accordance with the principles of the present invention.

DETAILED DESCRIPTION

Referring to the sole drawing FIGURE, it is a block diagram of a receiver 50 employing a residual carrier adaptive cross-polarization equalizer 10 in accordance with the principles of the present invention. The receiver comprises co-polarization and cross-polarization receiver channels 51, 52 for respectively processing co-polarized and cross-polarized signals. The co-polarized signals are amplified in a low noise amplifier 11 and applied to a summing device 12 which sums the amplified co-polarized signals with an output derived from the equalizer 10. The output of the summing device 12 is downconverted in a downconverter 13 and demodulated in a demodulator 15. I and Q output signals from the demodulator 15 are processed by a least mean-square estimate adaptive baseband equalizer 16 whose I and Q output signals are processed by a bit sync data detection (BSDD) circuit 17 to produce baseband output I and Q and clock (CLK) signals from the receiver 50. The cross-polarized signals are also processed by a substantially identical receiver channel 52 (although only a portion there is shown). An output of a power divider 18 of the co-polarization receiver channel is applied as an input signal to the adaptive cross-polarization equalizer 10. The circuitry shown in the drawing FIGURE illustrates only the adaptive cross polarization equalizer 10. A second identical residual carrier equalizer 10 is provided to equalize the cross-polarization channel 52.

The residual carder adaptive cross-polarization equalizer 10 comprises a residual carrier detector 40, a control circuit 30, and a vector modulator 20. The residual carder detector 40 is comprised of a multiplier 41 and a vector multiplier 42. The residual carder detector 40 processes recovered carder signals generated by the demodulator 15 in the co-polarized channel 51 and an output of the downconverter 13 of the cross-polarization channel 52 to generate an error signal. The error signal output of the residual carrier detector is applied to the control circuit 30.

The control circuit 30 comprises a low pass filter (LPF) 37, an analog to digital converter (A/D) 36, a logic circuit (LOGIC) 35, and a demultiplexer 33. The error signal output of the residual carrier detector 40 is filtered by the low pass filter 37. The filtered error output signal of the low pass filter 37 is coupled through the analog to digital converter 36 which processes it to produce a digitized error signal for processing. The output of the analog to digital converter 36 is processed by the logic circuit 35 which generates control signals that control the vector modulator 20. The output of the logic circuit 35 is demultiplexed by the demultiplexer 33, and the output of the demultiplexer 33 controls the vector modulator 20.

The vector modulator 20 comprises first and second multiplexers 22, 23 that combine output signals derived from the respective demultiplexer 33 with output signals generated by a zero-degree hybrid 24. The zero-degree hybrid 24 generates its output signals from the output of the power divider 18 of the cross-polarization receiver channel 52. Outputs of the respective multiplexers 22, 23 are applied to a ninety-degree hybrid 21 which combines the respective output signals therefrom and applies the summed signal to the summing device 12 in the co-polarized receiver channel 51 which sums this signal with the amplified co-polarized input signal.

The present residual carrier equalizer 10 thus uses the recovered carrier signal generated by the demodulator 15 in the co-polarized channel 51 and the output of the downconverter 13 of the cross-polarization channel 52 to determine the magnitude of the interfering signal and then inputs a cancelling signal into the copolarization channel 51 until power in the recovered carrier signal from the demodulator 15 is minimized. In the present equalizer 10, the determination of the magnitude of the interfering signal is performed at baseband (after demodulation but prior to data detection) and cancellation is performed at RF, prior to dispersive microwave elements. The present equalizer 10 enhances the capability for transmitting two unique signals in the same frequency allocation on orthogonal polarizations. The equalizer 10 operates even if the modulations and data rates on the two channels 51, 52 are different.

The present equalizer 10 provides a simple and inexpensive cross-polarization interference cancellation system. The equalizer 10 may be used with any digital modulation format and any data rate above ten Mbps on either channel. The equalizer 10 tracks variations in cross-polarization interference amplitude and phase of 10 Hz, minimum. If the cross-polarization phenomena is dispersive, additional taps may be added at RF and controlled using the same architecture.

The equalizer 10 provides a solution to the problem of cancelling an interfering signal due to low cross-polarization isolation caused by rain, for example, on high data rate communication links. In the receiver 50, both transmitted polarizations are received and amplified. A signal from the cross channel is supplied to the orthogonal receiver channel 51, 52. The RF vector modulator 20 is used to control the phase and amplitude of the cross-polarized signal prior to summation with the co-polarized signal. When the amplitude and the phase of the vector modulator 20 are correctly set, the interfering signal is cancelled.

Control for the vector modulator 20 is generated by minimizing the magnitude of the error signal produced by the residual carrier detector 40. The error signal is the difference between the received baseband data and an estimate of the ideal transmitted data. This signal is made up of data noise due to the non-ideal channel, thermal noise, and the interfering signal. The ratio of the interfering signal power to noise power determines the effectiveness of the equalizer 10.

The control logic circuit 35 that sets the phase and amplitude for the vector modulator 20 to minimize the magnitude of the recovered carrier signal does so by stepping the setting of the vector modulator 20 by one unit and sampling the power in the recovered carrier signal. If the power is reduced the vector modulator 20 is stepped again in the same direction. If the power is increased the vector modulator 20 is stepped in the opposite direction. The vector modulator 20 has two controls corresponding to an I-Q coordinate system. The controls are dithered one at a time, four consecutive times each using the demultiplexer 33.

The present equalizer 10 does not require symmetry between the orthogonal channels 51, 52. They may differ in both data rate and modulation. If the two cross polarization phenomena are not symmetrical, the equalizer 10 is not adversely effected. If the cross-polarization phenomena is dispersive, multiple vector modulators 20 may be added in a transversal filter arrangement and controlled in the same manner as described above.

Thus there has been described a new and improved residual carrier adaptive cross-polarization equalizer that reduces or minimizes crosstalk between cross-polarized channels utilizing pilot signals to indicate the level of crosstalk. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A residual carder adaptive cross-polarization equalizer for use with a receiver that provides for cancellation of an interfering signal due to low cross-polarization isolation, wherein the receiver comprises co-polarization and cross-polarization receiver channels for respectively processing co-polarized and cross-polarized input signals, and wherein each channel comprises a low noise amplifier for amplifying the input signals, first and second summing devices a downconverter, a demodulator, an adaptive baseband equalizer, and a bit sync data detection circuit for providing baseband output signals, and wherein said residual carrier adaptive cross-polarization equalizer comprises:

a residual carrier detector for processing recovered carder signals generated by the demodulator in the co-polarized channel and an output of the downconverter of the cross-polarization channel to generate an error signal;

a control circuit coupled to the residual carrier detector that comprises a low pass filter for filtering the error signal, an analog to digital converter for processing the filtered error signal to produce a digitized signal for processing, a logic circuit coupled to the analog to digital converter for generating control signals, and a demultiplexer coupled to the logic circuit; and a vector modulator comprising a zero-degree hybrid, first and second mixers coupled to the zero-degree hybrid and to the demultiplexer that combine control signals derived from the demultiplexer with output signals generated by the zero-degree hybrid, and a ninety-degree hybrid coupled to outputs of the respective mixers for combining the output signals from the mixers and applying it to the first summing device.

2. The equalizer of claim 1 which processes the error signal generated by the residual carrier detector to determine the magnitude of interfering signals and provides a cancelling signal until power in the error signal is minimized.

3. The equalizer of claim 2 wherein the vector modulator controls the phase and amplitude of the cross-polarized signal prior to summation with the co-polarized signal, and wherein the interfering signal is cancelled when the amplitude and the phase of the vector modulator are correctly set.

4. The equalizer of claim 1 wherein the control logic circuit generates control signals for the vector modulator by minimizing the magnitude of the error signal from the residual carrier detector.

5. The equalizer of claim 4 wherein the error signal is :proportional to the difference between received baseband data and an estimate of ideal transmitted data.

6. The equalizer of claim 1 wherein the control logic circuit sets the phase and amplitude for the vector modulator to minimize the magnitude of the error signal by stepping the setting of the vector modulator by one unit and sampling the power in the error signal, wherein if the power is reduced the vector modulator is stepped again in the same direction, and wherein if the power is increased the vector modulator is stepped in the opposite direction.

7. The equalizer of claim 6 wherein the control logic circuit dithers the control signals one at a time, four consecutive times each.

8. The equalizer of claim 1 wherein the residual carder detector comprises a multiplier coupled to a vector multiplier.

* * * * *